US008276479B2

(12) United States Patent
Shinbo

(10) Patent No.: US 8,276,479 B2
(45) Date of Patent: Oct. 2, 2012

(54) BREATHER

(75) Inventor: Noriyuki Shinbo, Makinohara (JP)

(73) Assignee: NOK Corporation (JP)

( * ) Notice: Subject to any disclaimer, the term of this patent is extended or adjusted under 35 U.S.C. 154(b) by 229 days.

(21) Appl. No.: 12/670,816

(22) PCT Filed: May 29, 2008

(86) PCT No.: PCT/JP2008/059898
§ 371 (c)(1),
(2), (4) Date: Jan. 26, 2010

(87) PCT Pub. No.: WO2009/050913
PCT Pub. Date: Apr. 23, 2009

(65) Prior Publication Data
US 2010/0187231 A1  Jul. 29, 2010

(30) Foreign Application Priority Data

Oct. 18, 2007  (JP) .................................. 2007-271502

(51) Int. Cl.
*F16H 57/04* (2010.01)
(52) U.S. Cl. .................................................... 74/606 R
(58) Field of Classification Search ............... 74/606 R;
123/574; 220/203.01, 203.02
See application file for complete search history.

(56) References Cited

U.S. PATENT DOCUMENTS

| 3,314,306 A * | 4/1967 | Barclae ....................... 74/606 R |
| 4,392,584 A | 7/1983 | Bauer |
| 4,794,942 A | 1/1989 | Yasuda et al. |
| 6,802,303 B2 * | 10/2004 | Håkansson .................... 123/574 |
| 6,889,674 B2 * | 5/2005 | Pateman et al. ............... 123/574 |
| 7,080,636 B2 * | 7/2006 | Knaus et al. ................... 123/572 |
| 7,644,706 B1 * | 1/2010 | Yoshida et al. ............... 123/572 |

FOREIGN PATENT DOCUMENTS

| JP | S56-76772 A | 6/1981 |
| JP | S59-113573 U | 7/1984 |
| JP | S63-20562 U | 2/1988 |
| JP | H04-10170 U | 1/1992 |
| JP | 06-117521 A | 4/1994 |
| JP | 2001-355713 A | 12/2001 |
| JP | 2007-127139 A | 5/2007 |

* cited by examiner

Primary Examiner — Vicky Johnson
(74) Attorney, Agent, or Firm — Harness, Dickey & Pierce, P.L.C.

(57) ABSTRACT

To perform exhaustion to regulate pressure in a case with surely recovering liquid in the case without draining it, even when the pressure in the case rises rapidly, a breather for regulating internal pressure in a case by performing exhaustion to the outside when the internal pressure exceeds predetermined pressure thereby reducing the internal pressure, includes an exhaust passage leading from the inside of the case to the outside; a liquid recovery passage for recovering liquid discharged from the inside of the case to the inside of the case; and a discharge valve means which opens when the internal pressure in the case exceeds the predetermined pressure, wherein the liquid recovery passage is provided at the atmosphere side beyond the discharge valve means, and a recovery valve means is provided in the liquid recovery passage.

6 Claims, 3 Drawing Sheets

BREATHER

CROSS-REFERENCE TO RELATED APPLICATIONS

This is a national stage of the International Application No. PCT/JP2008/059898 filed on May 29, 2008 and published in Japanese language.

BACKGROUND OF THE INVENTION

1. Field of the Invention

The present invention relates to a breather.

Further, the present invention relates to a breather which is installed to an apparatus such as an automatic transmission, for example, of a motor vehicle or the like, to regulate internal pressure of the apparatus by depressurization, etc. when the pressure in an internal portion of the apparatus is changed. Further, the present invention relates to a breather which is preferably attached to an upper portion of a sealed apparatus in which liquid is sealed in a sealed space.

2. Description of the Conventional Art

There has been conventionally known a breather as shown in Japanese Unexamined Patent Publication No. 2007-127139.

Since this kind of breather is structured such as to open and close a valve plate by a coil spring, not only the structure becomes complicated, but also the valve plate is opened more than necessary to cause a problem that fuel or working fluid within the apparatus tends to flow out, and muddy water or the like tends to make an intrusion from an external portion.

Accordingly, as a breather improved in these problematic points, there has been proposed a breather having a structure as shown in FIG. 3 (Japanese Unexamined Patent Publication No. 2001-355713).

The breather carries out exhaustion to reduce internal pressure in an inner portion of a case 600 through an exhaust passage 401 provided in the case 600, and recovers liquid such as oil or the like mixed in the exhaust passage 401 toward a liquid recovery passage 501 provided in the case 600.

The breather is constructed by a hexagon head bolt 200 fastened to a threaded hole 601 of the case 600, a cover 700 covering a periphery of the hexagon head bolt 200 to provide a surrounded space, and a compartment member 140 installed in the space formed by the cover 700.

The hexagon head bolt 200 is provided with a communication hole 201 formed in a shaft center from a leading end of a thread portion, and first and second passages 202 and 203 communicating orthogonally with the communication hole 201 and being open on an outer peripheral surface of a shaft portion.

The cover 700 is provided with a disc portion 701, and a cylinder portion 702 extending downward from a radially outer end of the disc portion 701.

The disc portion 701 is provided with an insertion hole 703 for inserting the hexagon head bolt 200 thereto.

Further, the cylinder portion 702 is provided with an exhaust hole 704 for exhaustion to an external portion.

The compartment member 140 is constructed by a metal ring 101, and a rubbery elastic body 102 integrally attached by baking to a periphery of the metal ring 101 and made of a material such as an acrylic rubber or the like.

The metal ring 101 is constructed by an annular portion 103, a first cylinder portion 104 bent upward from a radially inner end of the annular portion 103 so as to extend upward, and a second cylinder portion 105 bent downward from a radially outer end of the annular portion 103 so as to extend downward.

Further, the compartment member 140 is provided with a lip portion 106 extending in an upward and radially outer direction from a top face of the annular portion 103.

The compartment member 140 comparts the space within the cover 700 into an exhaust chamber 800 and a recovery chamber 900.

In the breather structured as mentioned above, when pressure within the case 600 rises beyond predetermined pressure, the lip portion 106 of the compartment member 140 is released from a contact state with the disc portion 701 of the cover 700 so as to become in a open state, the exhaustion to an external portion is carried out through the exhaust hole 704 from the exhaust chamber 800, and the internal pressure is reduced.

Further, in the case that liquid such as oil or the like exists much in the inner portion of the case 600, the liquid such as oil or the like is conducted into the communication hole 201 from the exhaust passage 401, and the liquid such as oil or the like within the communication hole 201 moves upward within the communication hole 201 in accordance with the rise of the internal pressure.

In this case, since the communication hole 201 is provided with the first passage 202, the liquid such as oil or the like flows into the first passage 202.

Accordingly, the liquid such as oil or the like is conducted to the recovery chamber 900 via the first passage 202, and is recovered into an inner portion of the case 600 from the recovery chamber 900 through the liquid recovery passage 501.

However, the liquid such as oil or the like which comes above the first passage 202 and flows out of the second passage 203 is hardly recovered, and there is a high risk of passing through the lip portion 106 so as to be discharged to an external portion.

Particularly, in the case that the internal pressure within the case 600 rapidly rises, this tendency is significant.

SUMMARY OF THE INVENTION

Problem to be Solved by the Invention

The present invention is made by taking the problem mentioned above into consideration, and an object of the present invention is to provide a breather which can securely recover liquid in an inner portion of a case without discharging outside, can carry out only exhaustion to an external portion, and can regulate pressure in the inner portion of the case, even when the pressure within the case rapidly rises.

Means for Solving the Problem

In order to achieve the object mentioned above, in accordance with the present invention, there is provided a breather for reducing internal pressure by carrying out exhaustion to an external portion so as to regulate the internal pressure in an inner portion of a case when the internal pressure in the inner portion of the case rises beyond predetermined pressure, the breather comprising:

an exhaust passage leading to the external portion from the inner portion of said case;

a liquid recovery passage for recovering the liquid discharged from the inner portion of said case to the inner portion of said case; and a discharge valve means which opens when the internal pressure in the inner portion of said case rises beyond the predetermined pressure, wherein said liquid recovery passage is provided at an atmospheric air side beyond said discharge valve means, and a recovery valve means is provided in the liquid recovery passage.

Effect of the Invention

The present invention achieves effects as described below.

In accordance with the breather of the present invention in a first aspect, even in the case that the pressure within the case rapidly rises, it is possible to securely recover the liquid in the inner portion of the case without discharging outside, and it is possible to carry out only the exhaustion to the external portion.

In accordance with the breather of the present invention in a second aspect, the structure is simple, and it is possible to securely open the discharge valve means when the internal pressure becomes the predetermined pressure, and it is possible to discharge the internal pressure to the external portion.

In accordance with the breather of the present invention in a third aspect, a contact pressure of the recovery lip does not change even if an attaching error happens in a radial direction.

In accordance with the breather of the present invention in a fourth aspect, the contact pressure of the recovery lip does not change even if the attaching error happens in an axial direction.

In accordance with the breather of the present invention in a fifth aspect, it is possible to securely block an intrusion of muddy water from the external portion, and it is possible to more securely prevent the liquid from flowing away to the outside of the case.

In accordance with the breather of the present invention in a sixth aspect, it is possible to block an outflow of the liquid even in the case that the liquid within the case suddenly bumps.

Further, in accordance with the breather of the present invention in a seventh aspect, it is possible to smoothly recover the liquid within the liquid recovery passage.

DETAILED DESCRIPTION OF PREFERRED EMBODIMENT

A description will be given below of a best mode for carrying out the present invention with reference to FIGS. 1 and 2.

Figure 1:
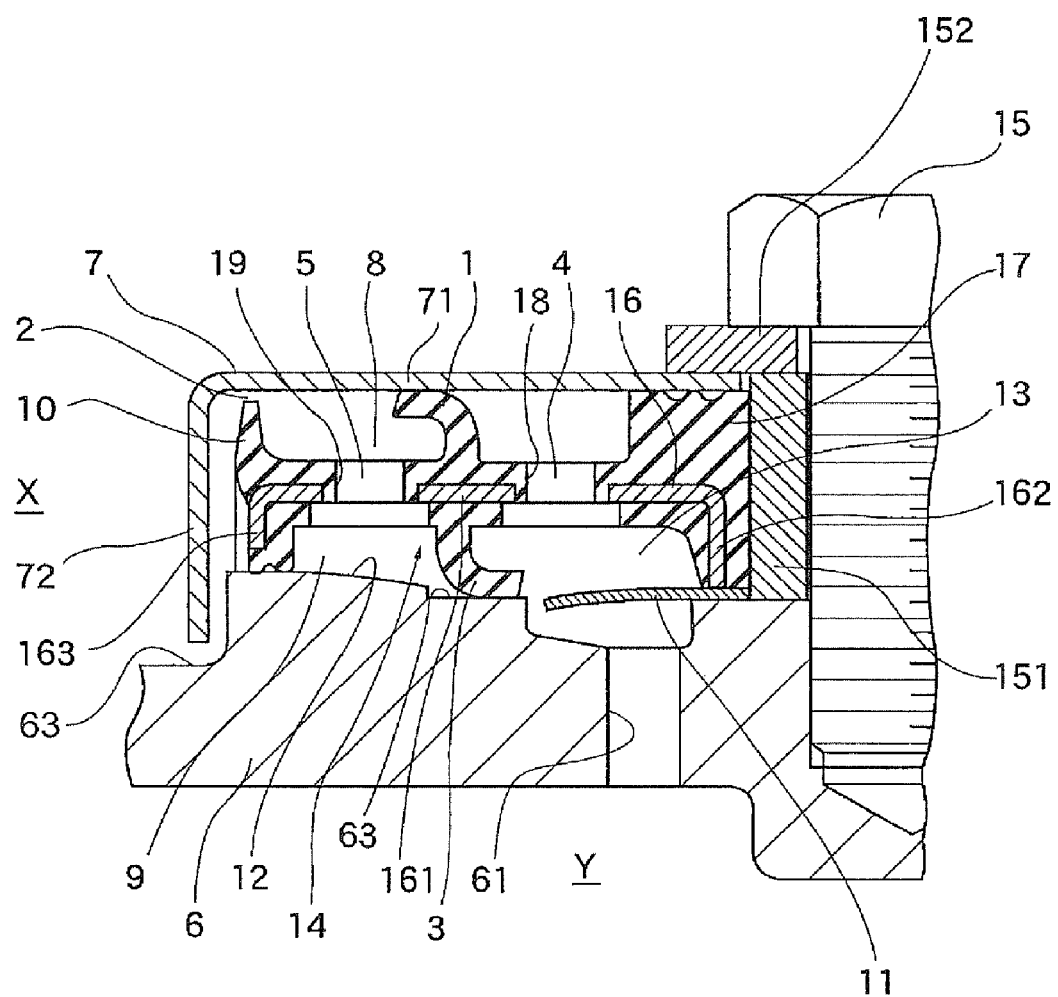
FIG. 1 is a sectional view showing an embodiment of the breather in accordance with the present invention.

FIG. 1 is a sectional view showing an embodiment of the breather in accordance with the present invention.

Figure 2:
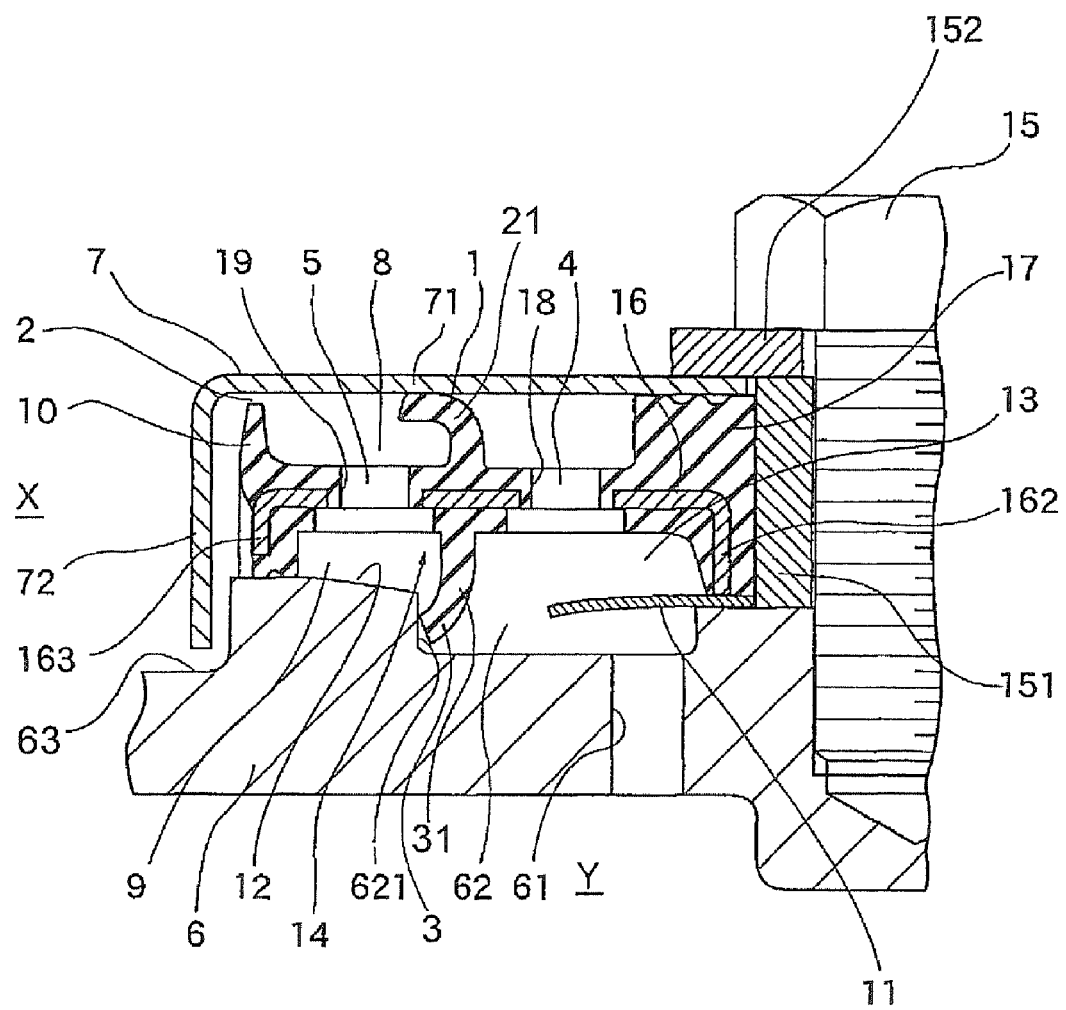
FIG. 2 is a sectional view showing another embodiment the breather in accordance with of the present invention.
Figure 3:
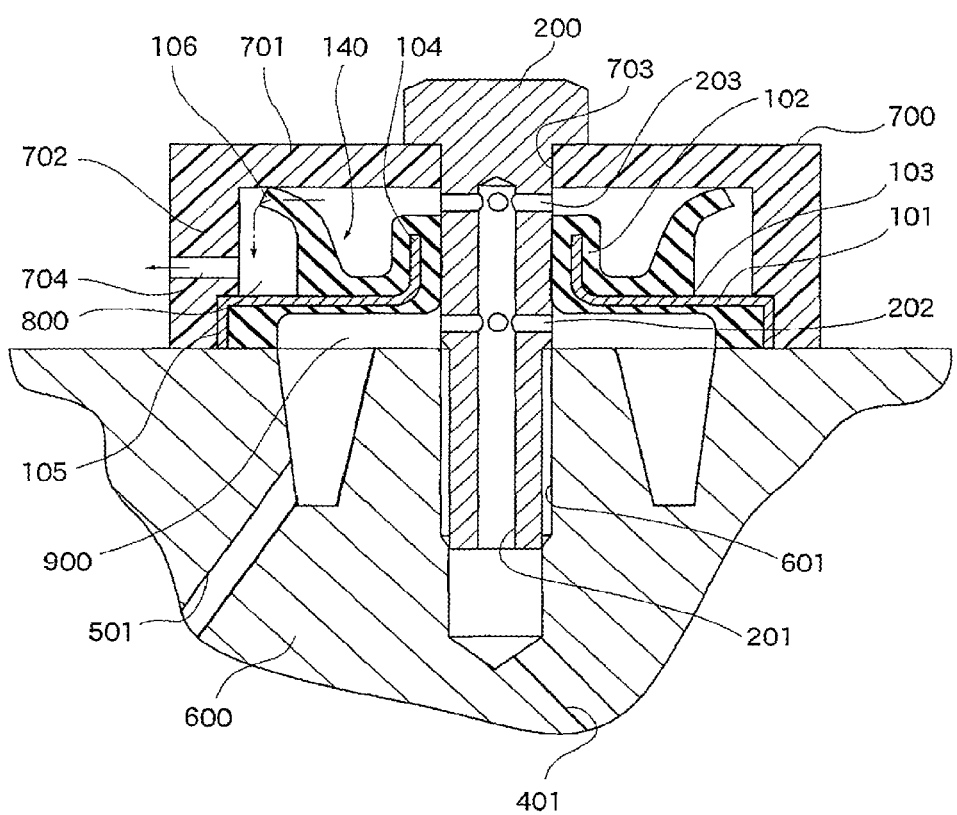
FIG. 3 is a cross sectional view showing a breather in accordance with a prior art.

FIG. 2 is a sectional view showing another embodiment of the breather in accordance with the present invention.

In FIG. 1, a breather in accordance with the present invention reduces internal pressure by carrying out exhaustion to an external portion so as to regulate the internal pressure in an inner portion Y of a case 6 when the internal pressure in the inner portion Y of the case 6 rises beyond a predetermined pressure.

The breather is constructed by an exhaust passage 4 leading to the external portion from the inner portion Y of the case 6, a liquid recovery passage 5 for recovering liquid discharged from the inner portion Y of the case 6 to the inner portion Y of the case 6, and a discharge valve means 1 which opens when the internal pressure in the inner portion Y of the case 6 rises beyond predetermined pressure, and is structured such that the liquid recovery passage 5 is provided at an atmospheric air X side beyond the discharge valve means 1, and a recovery valve means 3 is provided in the liquid recovery passage 5.

A cover body 7 is fixedly held onto a surface of the case 6.

A space 13 surrounded by the cover body 7 is comparted by a compartment member 14 into an exhaust chamber 8 and a recovery chamber 9.

The discharge valve means 1 is made of an elastic material such as an acrylic rubber or the like and provided integrally with the compartment member 14 so as to extend toward the atmospheric air X side, and, a discharge lip 21 elastically contacts with the cover body 7 side.

Further, the recovery valve means 3 is made of the rubbery elastic material and provided integrally with the compartment member 14 so as to extend toward the inner portion Y side, and a recovery lip 31 elastically contacts with the case 6 side.

A labyrinth passage 2 is provided in the atmospheric air X side beyond the liquid recovery passage 5.

A baffle plate 11 is arranged in the inner portion Y side of the exhaust passage 4.

A bottom face 12 of the recovery chamber 9 is formed as an inclined surface which converges toward the recovery lip 31 side.

The cover body 7 is made of a resin material such as a polyamide resin and the like, a metal material or the like, and is provided with a disc portion 71, and a cylinder portion 72 extending downward from a radially outer end of the disc portion 71.

The disc portion 71 is provided with an insertion hole for inserting a hexagon head bolt 15 thereto.

The cylinder portion 72 comes close to a step portion 63 provided in the case 6 so as to form a narrow gap, and serves to prevent muddy water from making an intrusion from an external portion.

The compartment member 14 is constructed by a metal ring 16, and a rubbery elastic body 17 made of a material such as an acrylic rubber or the like and integrally attached by baking around the metal ring 16.

The metal ring 16 is constructed by an annular portion 161, a first cylinder portion 162 bent downward from a radially inner end of the annular portion 161 so as to extend downward, and a second cylinder portion 163 bent downward from a radially outer end of the annular portion 161 so as to extend downward.

The compartment member 14 is provided with the discharge lip 21 extending in an upward and radially outer direction from a top face of the annular portion 161, the recovery lip 31 extending in a downward and radially inner direction from a lower face of the annular portion 161, and a labyrinth projection 10 extending approximately straight in an upward direction from a top face of an outer peripheral end portion of the annular portion 161 so as to come close to the disc portion 71 of the cover body 7.

The compartment member 14 is provided with an exhaust hole 18 for connecting a passage 61 and the exhaust chamber 8 at an inner side of the discharge lip 21, and a recovery hole 19 for connecting the exhaust chamber 8 and the recovery chamber 9 at an outer side of the discharge lip 21.

The cover body 7, the compartment member 14 and the baffle plate 11 are integrated by screwing the hexagon head bolt 15 with a thread groove provided in the case 6.

Further, a tubular sleeve 151 and a washer 152 are arranged in an outer periphery of the hexagon head bolt 15 for avoiding excessive fastening.

In the breather having the structure mentioned above, when the pressure within the case 6 rises beyond the predetermined pressure, the discharge lip 21 is released from a contact state with the disc portion 71 of the cover body 7 so as to become in a open state, exhaustion is carried out to the atmospheric air X side from the exhaust chamber 8 through the labyrinth passage 2, and the internal pressure is reduced.

In the case that liquid such as oil or the like exists much in the inner portion of the case 6, the liquid such as oil or the like is prevented from making an intrusion into the exhaust passage 4 firstly, by means of the baffle plate 11.

Further, the liquid such as oil or the like reaching the discharge lip 21 is returned to the inner portion of the case 6 through the exhaust hole 18.

Furthermore, the liquid such as oil or the like coming beyond the discharge lip 21 is reserved in the recovery chamber 9 through the recovery hole 19.

Then, when the recovery lip 31 is separated from the top face of the case 6 at the time of the pressure in the recovery chamber 9 side becoming higher than that of the inner portion Y side, the liquid reserved in the recovery chamber 9 flows into the passage 61 side.

Particularly, since the bottom face of the recovery chamber 9 is formed as the inclined face which converges toward the recovery lip 31 side, the recovery of the liquid is smoothly carried out.

Further, an annular lip is provided on each of an inner peripheral surface, which contacts with an outer peripheral surface of the sleeve 151, and an axial end face, which contacts with an inner peripheral side of the disc portion 71 of the cover body 7, at a radially inner peripheral side of the rubbery elastic body 17, so that a sealing performance is maintained.

Next, a description will be given of the other embodiment on the basis of FIG. 2.

A different point from the embodiment shown in FIG. 1 is an aspect that the recovery lip 31 elastically contacts with the case 6 side.

In particular, it is a point that the recovery valve means 3 shown in FIG. 2 elastically contacts with an inner peripheral surface 621 of an annular groove 62 provided on the case 6, while the recovery lip 31 shown in FIG. 1 elastically contacts with a flat top face 63 of the case 6.

Needless to say, the present invention is not limited to the best mode for carrying out the invention mentioned above, but can employ various structures without deviating from the scope of the present invention.

INDUSTRIAL APPLICABILITY

The present invention can be applied to the apparatus such as the automatic transmission or the like of the motor vehicle.

What is claimed is:

1. A breather for reducing an internal pressure by carrying out an exhaustion to an external portion so as to regulate the internal pressure in an inner portion of a case when the internal pressure in the inner portion of the case rises beyond predetermined pressure, the breather comprising:
    an exhaust passage leading to the external portion from the inner portion of said case;
    a liquid recovery passage for recovering the liquid discharged from the inner portion of said case to the inner portion of said case; and
    a discharge valve which opens when the internal pressure in the inner portion of said case rises beyond the predetermined pressure,
    wherein said liquid recovery passage is provided in an atmospheric air side beyond said discharge valve, and a recovery valve is provided in the liquid recovery passage, wherein the breather further comprises:
    a cover body fixedly held onto a surface of said case; and
    a compartment member for compartmenting a space surrounded by said cover body into an exhaust chamber and a recovery chamber, and
    wherein said discharge valve is made of a rubbery elastic material, is provided integrally with said compartment member so as to extend toward an atmospheric air side, and includes a discharge lip that elastically contacts said cover body, and said recovery valve is made of a rubbery elastic material, is provided integrally with said compartment member so as to extend toward said inner portion side, and a recovery lip that elastically contacts said case.

2. A breather as claimed in claim 1, wherein said recovery lip elastically contacts with a top face of said case.

3. A breather as claimed in claim 1, wherein said recovery lip elastically contacts with an inner peripheral face of an annular groove provided on a top face of said case.

4. A breather as claimed in claim 1, wherein a labyrinth passage is provided in an atmospheric air side beyond said liquid recovery passage.

5. A breather as claimed in claim 1, wherein a baffle plate is provided in an inner portion side of said exhaust passage.

6. A breather as claimed in claim 1, wherein a bottom face of said recovery chamber is formed as an inclined surface which converges toward said recovery lip side.

* * * * *